United States Patent Office 3,732,105

Patented May 8, 1973

3,732,105

LIGHT-SENSITIVE COPYING COMPOSITIONS

Kurt-Walter Klupfel, Wiesbaden-Sonnenberg, Hartmut Steppan, Wiesbaden-Dotzheim, and Herbert Maar, Wiesbaden, Germany, assignors to Kalle Aktiengesellschaft, Wiesbaden-Biebrich, Germany No Drawing. Filed Oct. 27, 1971, Ser. No. 193,139
Claims priority, application Germany, Oct. 30, 1970, P 20 53 363.5
Int. Cl. G03c *1/54, 1/70*
U.S. Cl. 96—115 P 10 Claims

ABSTRACT OF THE DISCLOSURE

This invention relates to a light-sensitive copying composition which comprises at least one light-sensitive substance of which the solubility decreases on exposure and at least one high molecular weight binder which is soluble or swellable in aqueous-alkaline solutions, the binder being a reaction product of at least one sulfonyl-isocyanate of the general formula $$R—SO_2—NCO$$

wherein R is selected from the group consisting of an alkyl or alkoxy group with 1 to 6 carbon atoms, an aryl or aryloxy group with 6 to 10 carbon atoms or a tertiary amino group, and as a second component a member selected from the group consisting of a vinyl alcohol polymer, epoxy resin, cellulose ester, cellulose ether or polyester with free OH groups, or a polyamine, polyamide or polyurethane.

This invention is concerned with improvements in and relating to light-sensitive copying compositions.

When using light-sensitive compositions or copying materials is reprography, for example in the photomechanical prodution of printing plates, those materials are generally preferred which after exposure can be developed with predominantly aqueous, especially aqueous-alkaline, solutions. In some cases it is also desirable to be able to carry out the development with weakly acid aqueous solutions.

Aqueous solutions have the advantage of low price, freedom from hazard and especially physiological harmlessness as compared with organic solvents. Alkaline solutions have the further advantage of having a particularly good cleansing action on the surface of the extensively used metal supports, especially aluminum supports.

Copying layers which can be developed with aqueous-alkaline materials are therefore used extensively. The desired property is in general achieved by adding oleophilic binders which are soluble or at least swellable in aqueous-alkaline solutions. In practice, polymers which contain carboxylic acid groups, carboxylic anhydride groups or phenolic hydroxyl groups are essentially used for this purpose. Polymers with carboxylic acid groups are above all used in photopolymerizable copying layers, while phenolic resins are frequently combined with quinone-diazides.

These types of binders, which are the most important for practical purposes, have certain disadvantages. Thus, it is disadvantageous to incorporate major amounts of phenolic resins into photopolymer layers, since these resins can inhibit the polymerization reaction. Phenolic resins furthermore can be employed only to a very limited extent for the manufacture of negatively working copying material based on diazonium salt condensation resins, since such mixtures are predominantly positively-working.

To manufacture copying materials intended for the manufacture of high performance planographic printing plates, aluminum supports of which the surface has been roughened in a particular way and thereby increased, and has frequently additionally then been hardened by anodizing, are at the present time being used to an increasing extent. A peculiarity of these surfaces is that they bind the above mentioned oleophilic binders firmly, and this manifests itself not only in a desired improvement of the adhesion of the image areas to the surface of the support, but in general also in an undesired fogging in the support surface which has been freed from the copying layer by development in the non-image areas. This defect also shows itself to a slight extent with other support materials.

The present invention provides a light-sensitive copying composition which contains, as essential constituents, at least one light-sensitive substance of which the solubility decreases on exposure and at least one high molecular weight binder which is soluble or swellable in aqueous-alkaline solutions, the binder being a reaction product of at least one sulfonyl-isocyanate of the general formula $$R—SO_2—NCO$$

wherein R is an alkyl or alkoxy radical with 1 to 6 carbon atoms, an aryl or aryloxy radical with 6 to 10 carbon atoms or a tertiary amino group, and as a second component a vinyl alcohol polymer, epoxy resin, cellulose ester, cellulose ether or polyester having free OH groups, a polyamine, polyamide or polyurethane.

Such light-sensitive copying compositions do not show the defect of fogging which has been described, or only show it to a greatly reduced extent, but in other respects possess the desirable properties of the known copying compositions.

A copying composition according to the invention can be utilized commercially in the form of a solution or dispersion, for example as a so-called photoresist composition, which the user himself applies to an individual support, for example for the manufacture of etching resist layers, and after drying can be exposed and developed. In this way, the composition can be used, for example, for the manufacture of printed circuits and the like. It also can be marketed in the form of a solid layer on a support, as a light-sensitive copying material, for example for the photomechanical manufacture of printing plates, especially of planographic printing plates.

Suitable light-sensitive substances for the copying compositions according to the invention are preferably photopolymerizable systems of polymerizable monomers and photoinitiators.

Suitable polymerizable compounds are known and are described, for example, in U.S. patent specifications Nos. 2,760,863 and 3,060,023. Examples are arcylic and methacrylic acid esters, such as diglycerol-diacrylate, guaiacol-glycerol-ether-diacrylate, neopentyl-glycol-diacrylate, 2,2-dimethylol-butanol-(3)-diacrylate and acrylates or methacrylates of polyesters containing hydroxyl groups. Furthermore, prepolymers of such polymerizable compounds, for example prepolymers of allyl esters, which themselves still contain polymerizable groups, are suitable for the manufacture of the photopolymer layers. In general, compounds which contain two or more polymerizable groups are preferred.

Suitable initiators are, for example, hydrazones, five-membered nitrogen-containing heterocyclic compounds, mercapto compounds, pyrylium and thiopyrylium salts, polynuclear quinones, synergistic mixtures of various ketones, drystuff/redox systems and certain acridine and phenazine compounds.

Condensation products of aromatic diazonium compounds are furthermore suitable for use as light-sensitive substances. Such condensation products are known. They are generally manufactured by condensation of a polynuclear aromatic diazonium compound, preferably of substituted or unsubstituted diphenyl-amino-4-diazonium salts, with an active carbonyl compound, preferably formaldehyde, in a strong acid medium. U.S. patent applications Ser. Nos. 826,289; 826,296; 826,297 describe further diazo condensates of this nature, which are mixed condensation products of the above-mentioned starting substances and condensable compounds not sensitive to light, for example diphenyl-ethers, diphenyl-sulfides, diphenylmethanes and diphenyls.

Other negatively-working diazo compounds, for example p-quinonediazides or p-iminoquinonediazides, also can be used as light-sensitive substances.

The polymeric substances listed above as suitable for the manufacture of the binders of the copying compositions according to the invention can be of the following nature:

Suitable vinyl alcohol polymers are polyvinyl alcohol and copolymers of vinyl alcohol with other vinyl monomers, for example vinyl chloride, vinylidene chloride, acrylates, methacrylates, vinyl ethers, acrylonitrile and the like, and also, in particular, the partially esterified or acetalized vinyl alcohol homopolymers and copolymers. Polyvinyl formals or polyvinyl butyrals having average molecular weights in the range of about 20,000 to 80,000 and containing from about 10 to 30 mole percent of vinyl alcohol units are particularly advantageous.

Epoxy resins are suitable if they contain sufficient amounts of free OH groups. Preferable are the condensation products of 2,2-bis-(4-hydroxy-phenyl)-propane (bisphenol A) and epichlorohydrin, with molecular weights between 900 and 200,000. Of these the resins with molecular weights below 10,000 are preferred.

Cellulose esters and cellulose ethers are also suitable, if they still contain sufficient amounts of free OH groups. There especially should be mentioned the partial esters with lower aliphatic carboxylic acids, such as cellulose acetate, cellulose propionate, cellulose acetate-butyrate and the like. Useful cellulose ethers are celluloses which are partially etherified with alkyl groups or mixed alkyl-hydroxyl-alkyl ethers of celluloses. In general, about 0.25 to 1.3 free OH groups should be present per glucose unit.

Suitable polyesters with free OH groups are those which are of low molecular weight of branched and contain hydroxyl groups, or polyesters containing units of trihydric or polyhydric alcohols which are not completely esterified.

Apart from the substnces with free OH groups which have been listed, the following types, which contain active hydrogen atoms linked to the nitrogen atom, are suitable: polyamines, for example poly-N-vinyl-N-methylamine, polyamides, for example condensation products of hexamethylenediamine and adipic acid, polycaprolactam and the like, polyurethanes, for example reaction products of ethylene glycol and diisocyanates, such as toluylene diisocyanate or diphenylmethane-4,4'-diisocyanate, and the like.

The best results are in general achieved with the reaction products of the above-mentioned polyvinyl acetals.

A large number of sulfonyl-isocyanates of the general formula $R—SO_2—NCO$, wherein R can be alkyl, alkoxy, aryl, aryloxy or a tertiary amino group, can be used for the manufacture of the binders employed according to the invention. Suitable substituents of the amino group are, for example, alkyl or acyl radicals with 1–6 carbon atoms or aryl radicals with 6–10 carbon atoms.

As particular examples there may be mentioned:

methanesulfonyl-isocyanate,
hexanesulfonyl-isocyanate,
β-chloroethanesulfonyl-isocyanate,
phenylsulfonyl-isocyanate,
p-toluenesulfonyl-isocyanate,
2,4,6-trimethyl-phenylsulfonyl-isocyanate,
4-fluoro-phenylsulfonyl-isocyanate, 4-chloro-phenylsulfonyl-isocyanate,
3,5-dichloro-phenylsulfonyl-isocyanate,
4-methoxy,
phenylsulfonyl-isocyanate,
3-nitro-phenylsulfonyl-isocyanate,
naphthalene-1-sulfonyl-isocyanate,
phenoxysulfonyl-isocyanate,
4-methyl-phenoxysulfonyl-isocyanate,
4-methoxy-phenoxysulfonyl-isocyanate,
4-chloro-phenoxysulfonyl-isocyanate,
4-tert.-butylphenoxysulfonyl-isocyanate,
4-cyclohexyl-phenoxysulfonyl-isocyanate,
2,4,6-trimethyl-phenoxysulfonyl-isocyanate and
N-methyl-N-(methanesulfonyl)-aminosulfonyl-isocyanate.

It is of advantage in the manufacture of the oleophilic polymers used according to the invention if, where a reliatively hydrophilic substance is employed as the starting polymer, more strongly oleophilic sulfonyl-isocyanates, for example aryl- or aryloxysulfonyl-isocyanates, are chosen, and correspondingly sulfonyl-isocyanates of the more hydrophilic type, for example lower alkyl- or alkoxy-sulfonyl-isocyanates are employed in the case of polymers which are already inherently very strongly oleophilic.

The binders used according to the invention are known as such (Polymer Letters 5, pages 77–78 (1967), U.S. Patent specification No. 3,433,075 and Chem. Rev. 65, 369 et seq. (1965)).

The sulfonyl-isocyanates as a rule react extremely easily with groups which carry active hydrogen and in particular do so even at room temperature. Thus, the use of catalysts can in general be dispensed with.

To manufacture the polymers used according to the invention, the polymer to be reacted is in general dissolved in a suitable solvent which is inert towards sulfonyl-isocyanates, for example dioxane, acetone, chloroform or phosphoric acid tris-dimethylamide, and the sulfonyl-isocyanate is added as such or as a solution in an inert solvent.

Polymeric compounds from the series of the polyvinyl acetals, cellulose esters and epoxy resins are for example dissolved in a 10–15-fold amount of anhydrous dioxane, with the addition of acetone, if appropriate. 0.5–1.5 moles of sulfonyl-isocyanate, relative to 1 mole of free OH groups, are added thereto, appropriately in the same solvent, at 40° C., in a dilution of about 1:5, and the mixture is stirred for further 4 hours at 40° C.

A slight rise in the temperature by 5–8° C. is dealt with by means of a water bath the temperature of which is kept constant thermostatically.

The clear solution is slowly added dropwise, at room temperature, to a 10-fold amount of water, whereupon the reaction product precipitates as a colorless, amorphous, but easily filtrable mass. It is appropriately suspended in water for a second time, and filtered off. The dried precipitate is then used for the preparation of the coating solutions.

It is also possible to use the reaction mixture obtained, if necessary after destroying any excess of sulfonyl-isocyanate still present, directly without isolation of the binder, or after dilution or concentration, for the preparation of coating solutions. In some cases, for example in the case of a series of photopolymerizable compositions, it is even possible to carry out the reaction with the sulfonyl-isocyanate in the presence of the light-sensitive constituents of the layer and then to use the reaction solution for coating. If as complete a reaction with the isocyanate as possible is desired, it has proved advantageous to employ at least 110%, preferably 125–150%, of the stoichiometric amount of sulfonyl-isocyanate per OH— or NH— group of the polymer to be reacted.

The proportion in the copying composition of the binders to be used according to the invention is in general 20–80% by weight. In the case of photopolymerizable layers, 40 to 60% by weight, in each case relative to solids, is preferred.

Even though the copying composition according to the invention can be used for the manufacture of thick copying layers, for example layers of up to 1 mm. thickness, the most important field of use is for thin layers, of 0.5–20μ thickness, preferably 2–6μ thickness, that is to say layers of a thickness such as is used for the photomechanical production of planographic printing plates or electrical circuits.

To prepare the coating solutions for photopolymer layers, the following procedure, for example, is adopted:

The following constituents are dissolved in a suitable solvent, for example ethylene glycol monomethyl ether, dioxane, ethylene glycol methyl ether-acetate or methyl ethyl ketone: the binder to be used according to the invention, monomers capable of addition polymerization, for example trimethyl-propane-triacrylate, trimethylolethane-triacrylate, 2,2′-dimethylol-butanol-(3-diacrylate, pentaerythritol-triacrylate, triethylene glycol-diacrylate or glycerol-diacrylate, and also 0.1–5%, preferably 2–4%, based upon the solvent-free copying composition mentioned, of suitable initiators, for example diacetyl, benzil, pivaloin, benzoin-methyl-ether, 2-ethyl-anthraquinone, 9 - phenol-acridine or 6,4′,4″-trimethoxy-2,3-diphenyl-quinoxaline and, if the stabilizer content in the monomers does not suffice, also small amounts of inhibitors such as p-methoxyphenol, hydroquinone, pyrogallol or 2,6-di-tert.-butyl-p-cresol: if desired, dyestuffs, pigments, plasticizers and other additives which have proven of value for such compositions also can be incorporated into the mixture.

The solutions are free from any gel constituents by means of a pressure filter and are applied in the usual manner, by centrifugal coating, casting or coating between counter-rotating dip and nip rollers, onto the support, for example mechanically brushed or electrolytically roughened, optionally anodized aluminum foils of 0.08 to 0.5 mm. thickness, and the coating is dried.

To manufacture thick layers of up to 250μ it is possible, for example, to knead the composition according to the invention, without a solvent, in a roll mill and to press it hydraulically for 1 to 2 minutes at 90° C. and under 30,000–50,000 kg.

The supports, coated with a layer of a thickness of 0.5 to 20μ, are subsequently provided with a 1 to 2μ thick oxygen-impermeable covering film, for example of polyvinyl alcohol. This can be done by casting with, or dipping into a 3% aqueous polyvinyl alcohol solution.

This coating protects the surface of the photopolymer layer against mechanical damage, prevents the copying originals from sticking thereto and hence becoming damaged, and inhibits the diffusion of further oxygen into the copying layer during exposure.

If the binders to be used according to the invention are combined with light-sensitive diazo compounds, the coating solutions are prepared, and the printing plates manufactured, in a known manner, for example as described in British patent specification No. 1,063,558 and in U.S. patent applications Ser. Nos. 826,297 and 826,296 now abandoned.

The development into positive printing plates of the plates which have been exposed image-wise in a known manner under a negative original can be effected with aqueous alkaline solutions of pH 7.5 to 9.5, for example 2 to 5% solutions of disodium phosphate and trisodium phosphate in distilled water. If necessary, 5 to 8% of an organic solvent, such as benzyl alcohol, glycerol, isopropyl alcohol, cyclohexanol or β-phenylethyl alcohol, can be added to facilitate the development. Possible failures in miscibility can be avoided by the addition of lower alcohols.

The developers described in German patent specification 1,193,366 also can be employed. In many cases it is also possible to effect the development with organic solvents or with mixtures of such solvents and water. This procedure is however not preferred. The copying materials according to the invention also can be developed, without difficulty, with weakly acid aqueous developer solutions, where this is desired for the light-sensitive system used. Appropriately, developer is first poured over the exposed plates and after acting for a short time, the plates are developed by wiping over with a swab or sponge.

The development, that is to say the removal of the unexposed areas, can in general last for seconds to minutes, depending on the choice of the alkali-soluble binder which has been described in accordance with the invention. After rinsing with water, the exposed areas are inked with a greasy ink and the printing plate is gummed in a known manner.

It is frequently advantageous to add dyestuffs, such as eosin, fuchsin or methylene blue to the coating solutions which have been described in accordance with the invention, in order thus to facilitate the visual observation of the development of the plate.

The binders used according to the invention permit the manufacture of printing plates which give very long runs. A particularly favourable group of binders are the reaction products of polyvinyl butyrals with molecular weights of 20,000 to 80,000 and OH contents of between 10 and 30 mole percent, especially with aryloxysulfonyl-isocyanates of the benzene series, and both types additionally can carry alkyl and/or alkoxy groups with a total of 1 to 6 carbon atoms as substituents. Reaction products for the manufacture of which 0.6 to 0.9 mole of the sulfonyl-isocyanate has been used per mole of OH groups are preferentially used for the manufacture of planographic printing plates.

The following examples illustrate the invention. The parts are by weight unless otherwise stated; the percentages are by weight, and the relationship between part by weight and part by volume is the same as that between the gram and the milliliter; ® means registered trademark.

EXAMPLE 1

An alkali-soluble binder is obtained as follows from p-toluene-sulfonyl-isocyanate (TSC) and a polyvinyl butyral of molecular weight about 30,000, which contains 71% of vinyl butyral units, 2% of vinyl acetate units and 27% of vinyl alcohol units.

11.3 parts of the polyvinyl butyral are dissolved in 170 parts of anhydrous dioxane over the course of 1 hour at 40° C., in a 4-necked flask equipped with stirrer, reflux condenser, dropping funnel and thermometer. 6.15 parts of TSC in 25 parts of dioxane are added dropwise over the course of 15 to 20 minutes at the same temperature, in the course of which a slight rise in temperature can be observed. The reaction is allowed to take place for a further 4 hours at 40° C., while stirring. After cooling to room temperature, the clear solution is sprayed into 2,000 parts by volume of water, appropriately by means of a nozzle. The colorless, granular precipitate is filtered off, again suspended in 1,000 parts by volume of water, filtered off and dried to constant weight.

*Analysis.*—Calculated (percent): N, 2.6; S, 6.0. Found (percent): N, 2.4; S, 5.4.

RSV-value (compare Example 2) at 25° C., 1% solution in ethylene glycol monomethyl ether=0.30 dl./g.

2 parts of the reaction product obtained, 0.5 part of a polyvinyl butyral of molecular weight about 75,000, which contains 71% of vinyl butyral units, 1% of vinyl acetate units and 27% of vinyl alcohol units, 2 parts of trimethylolpropane-triacrylate, 0.08 part of 2-ethyl-anthraquinone and 0.008 part of p-methoxyphenol are dissolved in 30 parts of ethylene glycol monomethyl ether, the solution is freed from any gel constituents by filtration and is subsequently applied to an aluminum foil which has been finely roughened by sandblasting, and the coating is dried onto the foil and post-dried for 2 minutes at 100° C. Layer weight 4 to 5 g./m.². After the layer has dried, it is provided with a coating of 1 to 2 g./m.² dry weight by casting a 3% aqueous polyvinyl alcohol solution over it, and drying.

After image-wise exposure under a negative, the plate is developed for about 30 seconds with a solution of 10 parts of sodium metasilicate·$9H_2O$ and 0.3 part of strontium hydroxide in 1,000 parts by volume of water, and is inked after wiping over with approximately 1% aqueous phosphoric acid. A positive printing plate which accepts ink well, and of which the non-image areas do not accept a greasy ink, is obtained.

The printing plate gives long runs on the conventional offset presses. If the plate is not to be used for printing immediately after manufacture, it can be gummed in known manner.

EXAMPLE 2

To manufacture the binder, 4.7 parts of a cellulose acetate with 1.7 acetyl groups per glucose unit are reacted with 5.9 parts of TSC. The binder, which gives a clear solution in 2% aqueous ammonia solution, has a reduced specific viscosity ($\eta_{red/c.}$, hereinafter abbreviated RSV) of 0.93 dl./g. as a 1% solution in ethylene glycol methyl ether-acetate at 25° C.

1 part of the binder, 1 part of trimethylolethane-triacrylate and 0.04 part of 9,9-dichloro-phenanthrone are dissolved in 16 parts of ethylene glycol methyl ether-acetate and applied by centrifugal coating onto an 0.08 mm. think electrolytically roughened aluminum foil to give a dry coating weight of 4 g./m.². A polyvinyl alcohol covering layer is applied as in Example 1.

The plate is subsequently exposed by means of a xenon impulse lamp of 5 kw. at a distance of 1 m. under a negative original for 6 minutes, at the same time copying a 21-step continuous tone grey wedge of density range 0.05 to 3.05 (density increment 0.15).

2% aqueous trisodium phosphate solution is used for development. A positive printing plate which accepts ink readily results. 8 steps of the grey wedge were depicted in full blackness on the plate.

EXAMPLE 3

11.35 parts of the polyvinyl butyral used without modification in Example 1 are reacted with 9.7 parts of 2,4,6-trimethyl-phenoxysulfonyl-isocyanate analogously to Example 1. The product gives a clear solution in 2% ammonia and has an RSV- value of 0.75 as a 1% solution in dioxane at 25° C.

1 part of binder, 1 part of pentaerythritol-triacrylate and 0.04 part of benzoin are dissolved in 16 parts of ethylene glycol monomethyl ether.

The solution is applied, by means of a coating device consisting of two driven counter-rotating dip and nip rollers, onto mechanically roughened aluminum, for example Fuller aluminum of Messrs. Fuller Brush, U.S.A., in such a way that the aluminum is passed through the nip formed by the two rollers at a speed of 21 m./minute, with the roughened side directed downwards. With a 21% solution and double coating, dry layer weights of between 5 and 7 g./m.² are obtained.

The application of the covering layer, image-exposure, development and inking are carried out as in Example 1.

EXAMPLES 4–13

The table which follows contains the following data in addition to the number of the example:

Column 1: binder, indicated as parts of starting polymer, designated with a Roman numeral, reacted with parts of sulfonylisocyanate, designated with capital letters (compare below).

Column 2: solvent in which the reaction to manufacture the binder is carried out. (In all cases, the binder is first separated out and redissolved in order to prepare the coating solution).

Column 3: analysis of the reaction products (binder).

Column 4: RSV-value at 25° C., in a 1% solution in the particular solvent indicated.

Column 5: monomer.

Column 6: weight ratio of binder to monomer.

Column 7: initiator (percent relative to monomer and binder).

Column 8: coating solvent and total concentration of the dissolved constituents of the layer.

Column 9: developer and development time.

In detail, the following abbreviations or symbols are used:

Starting polymers (I) Epoxy resin manufactured from bisphenol A and epichlorohydrin, of approximate molecular weight 900, containing 0.32 mole of OH groups per 100 g. of resin.

(II) Polyvinyl butyral, which contains 77% of vinyl butyral units, 2% of vinyl acetate units and 21% of vinyl alcohol units and of which the molecular weight is about 32,000.

(III) Polyvinyl-methylamine.

(IV) Polyurethane from 5 parts of ethylene glycol and 4 parts of diphenylmethane-4,4'-diisocyanate. RSV-value (1% in dimethylformamide at 25° C.): 0.13.

(V) Copolyamide of hexamethylenediamine adipate and caprolactam, of approximate melt temperature 185° C.

(VI) Polyvinyl butyral as in Example 3.

(VII) Cellulose acetate of 38.4% acetyl content, with 0.65 free hydroxyl groups per glucose unit and a viscosity of 380 cp. in a 10% solution in 9:1, acetone/methanol.

(VIII) Copolyamide of several amide-forming components. Approximate melt temperature 185° C. (Ultramid 1 C of BASF).

(IX) Polyvinyl butyral containing 71% of vinyl butyral units, 1% of vinyl acetate units and 27% of vinyl alcohol units and of molecular weight about 50–60,000.

Sulfonyl-isocyanates

A: β-chloroethylsulfonyl-isocyanate,
B: N-methyl-N-methanesulfonyl-amino-sulfonyl-isocyanate,
C: 4-methyl-phenoxy-sulfonyl-isocyanate,
D: p-toluenesulfonyl-isocyanate,
E: 2,4,6-trimethyl-phenoxy-sulfonyl-isocyanate.

Solvents

GMME—Ethylene glycol monomethyl ether,
MGAC—Ethylene glycol methyl ether-acetate,
DMSO—Dimethylsulfoxide,
DMF—Dimethylformamide
BUAC—n-Butyl acetate

Monomers

TMPTA—1,1,1-trimethylol-propane-triacrylate
TMETA—1,1,1-trimethylol-ethane-triacrylate.

Initiators

EA—2-ethyl-anthraquinone
DCPH—9,9-dichloro-phenanthrone.

Developers

D1—2% trisodium phosphate·$12H_2O$ in water,
D2—0.5% trisodium phosphate·$12H_2O$ in water,
D3—1% trisodium phosphate·$12H_2O$ in water,
D4—0.1% NaOH in water,
D5:
- 12 parts of benzyl alcohol
- 20 parts of ethanol
- 10 parts of disodium phosphate·$12H_2O$,
- 2.5 parts of trisodium phosphate·$12H_2O$
- 465 parts of water D7—developer used in Example 1.

Electrolytically roughened aluminum foil is used as the support in Examples 4–13.

| Example No. | Binder from— | Manufactured in— | Analysis percent | | | RSV value | Monomer | Weight ratio of binder/monomer | Initiator | Solvent and concentration of coating solution | Development time and developer |
|---|---|---|---|---|---|---|---|---|---|---|---|
| | | | C | N | S | | | | | | |
| 4 | 10 parts I and 5.9 parts A | Absolute dioxane | 57.8 | 2.4 | | 0.08 MGAC | TMPTA | 1:1 | 2% EA | MGAC/BUAC, 9:1, 13% | 30 seconds, D 1. |
| 5 | 12.0 parts II and 6.74 parts B | do | 49.7 | 3.8 | 9.3 | 0.33 MGAC | TMPTA | 6:4 | 2% EA | MGAC/BUAC, 9:1, 11% | 45 seconds, D 2. |
| 6 | 2.5 parts III and 10.5 parts C | Absolute chloroform | | 10.2 | 11.5 | 1.05 DMSO | TMETA | 6:4 | 2% EA | DMSO, 10% | 45 seconds, D 3. |
| 7 | 5.1 parts IV and 8.26 parts D | Phosphoric acid tris-dimethylamide | | 8.2 | 7.1 | 0.09 DMF | TMPTA | 1:1 | 2% EA | DMF, 12% | 1 minute, D 4. |
| 8 | 5.0 parts V and 7.3 parts A | do | 51.0 | 11.3 | 5.6 | 0.51 DMF | TMPTA | 4:6 | 2% EA | DMF, 11.5% | 1½ minutes, D 5. |
| 9 | 11.4 parts VI and 8.5 parts D | Absolute dioxane | 56.1 | 2.6 | 6.0 | 0.81 MGAC | TMPTA | 6:4 | 2% EA | MGAC/BUAC, 9:1, 11.3% | 1 minute, D 6. |
| 10 | 11 parts VII and 6.0 parts C | do | | 2.0 | 4.2 | 1.06 MGAC | TMETA | 1:1 | 2% EA | MGAC/BUAC, 7:1, 10.5% | 1 minute, D 5. |
| 11 | 5 parts VIII and 7.3 parts A | Phosphoric acid tris-dimethylamide | 50.9 | 12.1 | 6.1 | 0.26 DMF | TMPTA | 1:1 | 2% EA | DMF, 11.5% | 2 minutes, D 5. |
| 12 | 12.3 parts II and 6.7 parts C | Absolute dioxane | 58.4 | 2.0 | 4.7 | 0.32 MGAC | TMPTA | 6:4 | 2% EA | MGAC/BUAC, 9:1, 11.2% | 20 seconds, D 2. |
| 13 | 11.4 parts IX and 5.3 parts E | do | 56.0 | 2.3 | 5.2 | 0.34 dioxane | TMPTA | 1:1 | | GMME, 11% | 1 minute, D 5. |

The image exposure under a negative original is carried out with a 5 kw. xenon impulse lamp. The exposure time is about 5 minutes. In other respects, the procedure followed is analogous to Examples 1 to 3.

EXAMPLE 14

5.7 parts of the polyvinyl butyral modified as in Example 1 and 2.3 parts of the unmodified polyvinyl butyral used in Example 1 are reacted with 3.4 parts of p-toluenesulfonyl-isocyanate in 120 parts of absolute dioxane at 40° C., as in Example 1. After 3 hours, the reaction solution is cooled to 20° C. and 11 parts of trimethylolethanetriacrylate and 0.9 part of 9,9-dichlorophenanthrone, dissolved in 50 parts of ethylene glycol monomethyl ether, are added. After a further 30 minutes, the coating solution is filtered through a pressure filter and applied to aluminum foil which has been finely roughened by sandblasting, dried onto the foil and post-dried for a further 2 minutes at 100° C. The layer weight is 6 to 7 g./m.$^2$. After drying, the layer is provided with a coating of 1 to 2 g./m.$^2$ dry weight by casting a 3% aqueous polyvinyl alcohol solution over it.

The photopolymer layer is exposed and developed as indicated under Example 1.

A positive printing plate which accepts ink well and of which the non-image areas do not accept a greasy ink is obtained.

EXAMPLE 15

3.4 parts of the reaction product of 10.5 parts of polymer II from Examples 4 to 13 and 7.3 parts of p-toluenesulfonyl-isocyanate in absolute dioxane, giving analytical results of C, 61.9%, N, 2.0% and S, 4.4%, are dissolved, together with 0.4 part of the polyvinyl butyral used in Example 1 without modification, 0.4 part of a styrene/maleic anhydride copolymer of average molecular weight 20,000 and acid number 180 ("Lytron"® 820 of Monsanto Chemical Co., St. Louis, U.S.A.), 3.2 parts of trimethylol-ethane-triacrylate and 0.3 part of 2-ethyl-anthraquinone, in 30 parts of methyl ethyl ketone. The solution is poured onto an electrolytically roughened aluminum foil and dried for 3 days in air. After drying, the layer thickness is 150μ. The somewhat tacky layer is dusted with talc and exposed for 15 minutes under a negative original by means of an 8 kw. BIKOP xenon point light source of Messrs. Klimsch, Frankfurt/M., at a distance of 75 cm.

The exposed plate is subsequently dipped for 4 minutes into a developer bath consisting of 80 parts of a 2% aqueous solution of $Na_3PO_4 \cdot 12H_2O$ and 20 parts of isopropyl alcohol, and at the same time the unexposed image areas are removed by light wiping over with a soft paint brush.

A well-adhering, flexible, positive relief printing plate of 150μ depth is obtained, which can be employed for "letterset printing."

EXAMPLE 16

An aluminum foil which has been electrolytically roughened, subsequently anodized and finally treated with polyvinyl phosphonic acid in accordance with U.S. patent specification No. 3,220,832 is coated with a solution of the composition given below and the coating dried onto the foil:

1.1 parts of the diazo co-condensation product described below,
0.6 part of the diazo homocondensate described below,
0.2 part of p-toluenesulfonic acid $\cdot H_2O$,
3.0 parts of the polyvinylbutyral, modified with toluenesulfonylisocyanate, used in Example 15 and
100 parts by volume of a mixture of ethylene glycol monomethyl ether and butyl acetate in a volume ratio of 8:2.

The copying material is exposed image-wise under a negative original, developed and inked with greasy ink. A positive planographic printing plate is obtained which gives long printing runs.

Even though development to give a printing plate is possible by means of aqueous alkaline developers containing a small quantity of organic solvent, weakly acid developers are preferred for the diazo condensates used in this case. Good results are obtained, for example, with the following mixture:

50 parts of water
15 parts of isopropanol
20 parts of n-propanol
12.5 parts of n-propyl acetate
1.5 parts of polyacrylic acid
1.5 parts of acetic acid.

The contrast can be improved further by subsequent treatment with the following solution:

100 parts of water
5 parts of 50% strength sodium lauryl sulfate (remainder sodium sulfate)
3 parts of tartaric acid
2 parts of benzyl alcohol.

The diazo co-condensate is obtained as follows: 32.3 parts of 3-methoxy-diphenylamine-4-diazonium sulfate are dissolved in 170 parts of 85% phosphoric acid, 25.8 parts of 4,4'-bis-methoxymethyl-diphenyl-ether are added dropwise and the mixture is condensed for 5 hours at 40° C. After dilution with 250 parts by volume of water, the chloride of the condensation product is precipitated by adding 220 parts by volume of semi-concentrated hydrochloric acid. The chloride of the condensate is redissolved in water and on adding sodium mesitylene sulfonate, the mesitylene sulfonate of the diazo compound is obtained as a precipitate which is sparingly soluble in water. Yield: 53 parts (C, 67.2%, N, 6.3%, S, 4.6%, atomic ratio 37.3:0.96).

The diazo homocondensate is manufactured as follows: 0.63 part of paraformaldehyde and 5 parts of 3-methoxy-diphenylamino-4-diazonium chloride are successively added to 4.8 parts by volume of 85% phosphoric acid, while stirring, and the mixture is then stirred for a further 40 hours at 40° C. After cooling, 5 parts by volume of 85% phosphoric acid are added and dry air is passed through the reaction mixture until no further chloride ions are detectable. 2.5 parts by volume of 85% phosphoric acid and 40 parts by volume of methanol are then added and the resulting mixture is poured into 170 parts by volume of isopropanol while stirring until the precipitate has been converted into an easily filtrable form. The precipitate is filtered off, again suspended in 50 parts by volume of isopropanol, filtered off and dried. Yield: 7.2 parts. Before use, the product is adjusted so as to contain 2.8 moles of phosphoric acid per mole of diazo groups.

It will be obvious to those skilled in the art that many modifications may be made within the scope of the present invention without departing from the spirit thereof, and the invention includes all such modifications.

What is claimed is:

1. A light-sensitive copying composition which comprises at least one light-sensitive substance of which the solubility decreases on exposure and at least one high molecular weight beinder which is soluble or swellable in aqueous-alkaline solutions, the binder being a reaction product of at least one sulfonyl-isocyanate of the general formula $$R—SO_2—NCO$$

wherein R is selected from the group consisting of an alkyl or alkoxy group with 1 to 6 carbon atoms, an aryl or aryloxy group with 6 to 10 carbon atoms or a tertiary amino group, and as a second component a member selected from the group consisting of a vinyl alcohol polymer, epoxy resin, cellulose ester, cellulose ether or polyester with free OH groups, or a polyamine, polyamide or polyurethane.

2. A composition as claimed in claim 1, in which in the sulfonylisocyanate the group R is an aryl or aryloxy group.

3. A composition as claimed in claim 1 in which the reaction product contains a polyvinyl acetal as a second component.

4. A composition as claimed in claim 3, in which as the polyvinyl acetal is a polyvinyl formal or polyvinyl butyral with an average molecular weight in the range of 20,000 to 80,000, and containing 10 to 30 mole per unit of vinyl alcohol units.

5. A composition as claimed in claim 1 in which the binder is a reaction product of p-toluenesulfonyl-isocyanate and a polyvinyl butyral having free vinyl alcohol units.

6. A composition as claimed in claim 1 in which the binder is a reaction product of p-toluenesulfonyl-isocyanate and partially acetylated cellulose.

7. A composition as claimed in claim 1 in which the binder is a reaction product of 2,4,6-trimethyl-phenoxysulfonyl-isocyanate and a polyvinyl butyral having free vinyl alcohol units.

8. A composition as claimed in claim 1 in which the binder is a reaction product of 4-methyl-phenoxysulfonyl-isocyanate and a polyvinyl butyral having free vinyl alcohol units.

9. A composition as claimed in claim 1 containing, as the light-sensitive substance, a photopolymerizable system of a polymerizable monomer and a photoinitiator.

10. A composition as claimed in claim 1 in the form of a solid layer on a support.

References Cited

UNITED STATES PATENTS 3,147,116 9/1964 Roth ---------------- 96—115

RONALD H. SMITH, Primary Examiner

U.S. Cl. X.R.

96—33, 91 D, 91 N, 115 R; 204—159.15